US008776528B2

(12) United States Patent
Liedtke et al.

(10) Patent No.: US 8,776,528 B2
(45) Date of Patent: Jul. 15, 2014

(54) METHOD FOR OPERATING A GAS TURBINE PLANT WITH A COMPRESSOR STATION FOR GASEOUS FUEL

(75) Inventors: Klaus-Dieter Liedtke, Endingen (CH); Mengbin Zhang, Zurich (CH); Ulf Schirmeister, Endingen (CH); Aysegul Kirecci, Baden (CH)

(73) Assignee: Alstom Technology Ltd., Baden (CH)

( * ) Notice: Subject to any disclaimer, the term of this patent is extended or adjusted under 35 U.S.C. 154(b) by 1042 days.

(21) Appl. No.: 12/779,559

(22) Filed: May 13, 2010

(65) Prior Publication Data

US 2010/0287945 A1 Nov. 18, 2010

(30) Foreign Application Priority Data

May 13, 2009 (CH) .......................... 746/09

(51) Int. Cl.
| F02C 9/32 | (2006.01) |
| F23N 1/00 | (2006.01) |
| F02C 7/22 | (2006.01) |
| F02C 9/26 | (2006.01) |
| F02C 3/22 | (2006.01) |
| F23N 5/18 | (2006.01) |

(52) U.S. Cl.
CPC ............... *F02C 7/22* (2013.01); *F23N 2025/04* (2013.01); *F23N 2005/185* (2013.01); *F05D 2270/3013* (2013.01); *F23N 1/002* (2013.01); *F23N 2041/20* (2013.01); *F23N 2037/20* (2013.01); *F02C 9/263* (2013.01); *F05D 2270/3011* (2013.01); *F02C 3/22* (2013.01)
USPC ............... 60/772; 60/39.281; 431/38; 431/61

(58) Field of Classification Search
USPC .............. 60/39.281, 39.465, 39.48, 734, 739, 60/772, 773; 431/19, 38, 44, 61, 65, 82, 431/157; 417/278; 137/14
See application file for complete search history.

(56) References Cited

U.S. PATENT DOCUMENTS 3,738,102 A * 6/1973 Stearns et al. ............. 60/39.281
4,591,317 A * 5/1986 Markunas ..................... 417/288
(Continued)

FOREIGN PATENT DOCUMENTS

DE 10 2007 007 888 A1 8/2007
EP 0 661 426 A 7/1995
(Continued)

OTHER PUBLICATIONS

Office Action dated Mar. 1, 2013, issued by the Mexican Patent Office in the corresponding Mexican Patent Application No. MX/a/2010/005228 (2 pages).

(Continued)

*Primary Examiner* — Gerald L Sung
*Assistant Examiner* — Michael B Mantyla
(74) *Attorney, Agent, or Firm* — Buchanan Ingersoll & Rooney PC

(57) ABSTRACT

The disclosure relates to a method for operating a gas turbine plant which is supplied with a fuel gas via a compressor station. The compressor station includes a compressor which compresses the fuel gas which is fed via a gas feed line and delivers it via at least one control valve to a combustion chamber of the gas turbine plant. A bypass system is arranged in parallel to the compressor via which fuel gas can be directed in a switchable manner past the compressor to the at least one control valve. An energy-saving operation can be achieved in a simple manner by continuously measuring the fuel gas pressure at the outlet of the at least one control valve. A minimum fuel gas pressure, which is desired (e.g., necessary) for operation of the gas turbine, at the inlet of the at least one control valve is determined from the measured pressure values in each case. The compressor station can be switched over to bypass operation when the fuel gas pressure which reaches the inlet of the at least one control valve via the bypass system is greater than or equal to the minimum fuel gas pressure.

5 Claims, 2 Drawing Sheets

(56) References Cited

U.S. PATENT DOCUMENTS

| | | | | |
|---|---|---|---|---|
| 4,983,301 | A | * | 1/1991 | Szucz et al. .................... 210/636 |
| 5,251,148 | A | * | 10/1993 | Haines et al. ................. 700/282 |
| 5,609,016 | A | | 3/1997 | Yamada et al. |
| 6,145,297 | A | * | 11/2000 | Nagafuchi et al. ......... 60/39.281 |
| 6,551,068 | B2 | * | 4/2003 | Blotenberg ..................... 417/53 |
| 7,497,668 | B2 | * | 3/2009 | Brautsch et al. .............. 417/278 |
| 7,549,293 | B2 | | 6/2009 | Gallagher et al. |
| 7,610,746 | B2 | * | 11/2009 | Fujii et al. .................. 60/39.281 |
| 2001/0022938 | A1 | | 9/2001 | Blotenberg |
| 2002/0038540 | A1 | * | 4/2002 | Griffiths et al. ............ 60/39.281 |
| 2007/0012358 | A1 | | 1/2007 | Brautsch et al. |
| 2009/0025396 | A1 | * | 1/2009 | Joshi et al. ..................... 60/773 |
| 2009/0241510 | A1 | | 10/2009 | Gallagher et al. |

FOREIGN PATENT DOCUMENTS

| | | |
|---|---|---|
| EP | 1 134 422 A2 | 9/2001 |
| EP | 1 635 066 A2 | 3/2006 |
| EP | 2 251 534 A1 | 11/2010 |

OTHER PUBLICATIONS

Swiss Search Report for CH 746/2009 dated Sep. 4, 2009.

* cited by examiner

METHOD FOR OPERATING A GAS TURBINE PLANT WITH A COMPRESSOR STATION FOR GASEOUS FUEL

RELATED APPLICATIONS

This application claims priority under 35 U.S.C. §119 to Swiss Patent Application No. 00746/09 filed in Switzerland on May 13, 2009, the entire content of which is hereby incorporated by reference in its entirety.

FIELD

The present disclosure relates to the field of gas turbine technology, and to a method for operating a gas turbine plant.

BACKGROUND INFORMATION

A compressor station of a gas turbine plant for compressing a fuel gas, which is equipped with a bypass system, has the capacity to supply the gas turbine with the fuel gas, bypassing the compressor via the bypass system. In such a case, the compressor can be shut down and therefore the power consumption of the compressor station can be significantly reduced.

It is known to perform such a bypass operation if the supply pressure of the fuel gas was higher than a predetermined minimum pressure which had been calculated on the basis of the base load of the gas turbine and under the assumption of unfavorable boundary conditions in the environment of the gas turbine. Due to these rigid specifications, it was not previously possible to exploit the full cost savings potential by use of a bypass operation in the compressor station.

SUMMARY

A method for operating a gas turbine plant is disclosed which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising: measuring continuously the fuel gas pressure at an outlet of the at least one control valve; determining for each valve a minimum fuel gas pressure, for operation of the gas turbine, at an inlet of the at least one control valve from the measured fuel gas pressure; and switching over the compressor station to a bypass operation if the fuel gas pressure which reaches the inlet of the at least one control valve via the bypass system is greater than or equal to the minimum fuel gas pressure.

A method for operating a gas turbine plant is disclosed which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising: measuring continuously a difference of the fuel gas pressure at an inlet of the control valve and of a pressure drop at the control valve; determining for each valve a minimum fuel gas pressure for operation of the gas turbine, at the inlet of the at least one control valve from the measured difference; and switching over the compressor station to a bypass operation when the fuel gas pressure which reaches the inlet of the at least one control valve via the bypass system is greater than or equal to the minimum fuel gas pressure.

A method for operating a gas turbine plant is disclosed which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising: measuring continuously a difference of the supply pressure at an inlet of the compressor station and of a pressure drop between the inlet and the bypass system; determining for each valve a minimum fuel gas pressure, for operation of the gas turbine, at the inlet of the at least one control valve from the measured difference; and switching over the compressor station to a bypass operation when the fuel gas pressure which reaches the inlet of the at least one control valve via the bypass system is greater than or equal to the minimum fuel gas pressure.

BRIEF DESCRIPTION OF THE DRAWINGS

The disclosure shall subsequently be explained in more detail based on exemplary embodiments in conjunction with the drawings. In the drawings.

DETAILED DESCRIPTION

An exemplary method for operating a gas turbine plant with an upstream compressor station for compressing a gaseous fuel utilizes a bypass system which is arranged inside the compressor station. The method can achieve energy savings, as a result of an optimized bypass operation. At the same time a stable operation of the gas turbine can be ensured without a change of output when starting the bypass operation.

In an exemplary method the fuel gas pressure at the outlet of at least one control valve is continuously measured. From the measured pressure values a minimum fuel gas pressure at the inlet of the at least one control valve can be determined which is desired (e.g., necessary) for operation of the gas turbine. The compressor station can be switched over to a bypass operation if the fuel gas pressure which reaches the inlet of the at least one control valve via the bypass system is greater than or equal to the desired (e.g., necessary) minimum fuel gas pressure. As a result of this, the operation of the compressor can be controlled considerably more accurately and therefore in a more energy saving manner than before.

In an exemplary method the compressor directs the fuel gas to a plurality of control valves arranged in parallel. The fuel gas pressure at the outlet of each of the control valves is continuously measured. From the measured pressure values, for each of the control valves, a minimum fuel gas pressure at the inlet of the corresponding control valve is determined, which is desired (e.g., necessary) for operation of the gas turbine. The compressor station can be switched over to bypass operation if the fuel gas pressure which reaches the inlets of the control valves via the bypass system is greater than or equal to the maximum of the necessary minimum fuel gas pressures of all the control valves.

According to another exemplary embodiment, the minimum fuel gas pressure which is desired (e.g., necessary) for operation of the gas turbine can be determined in each case by multiplying the fuel gas pressure at the outlet of the at least one control valve by a factor.

The factor can be, for example, determined by a constant ratio of minimum pressure drop across the control valve to the fuel gas pressure at the inlet of the control valve.

In another exemplary embodiment instead of the fuel gas pressure at the outlet of the at least one control valve the difference of the fuel gas pressure at the inlet of the control valve and the pressure drop at the control valve can be used.

In another exemplary embodiment for determining the fuel gas pressure which reaches the inlet of the at least one control valve, the difference of the supply pressure at the inlet of the compressor station and the pressure drop between the inlet and the bypass system can be used.

Figure 1:
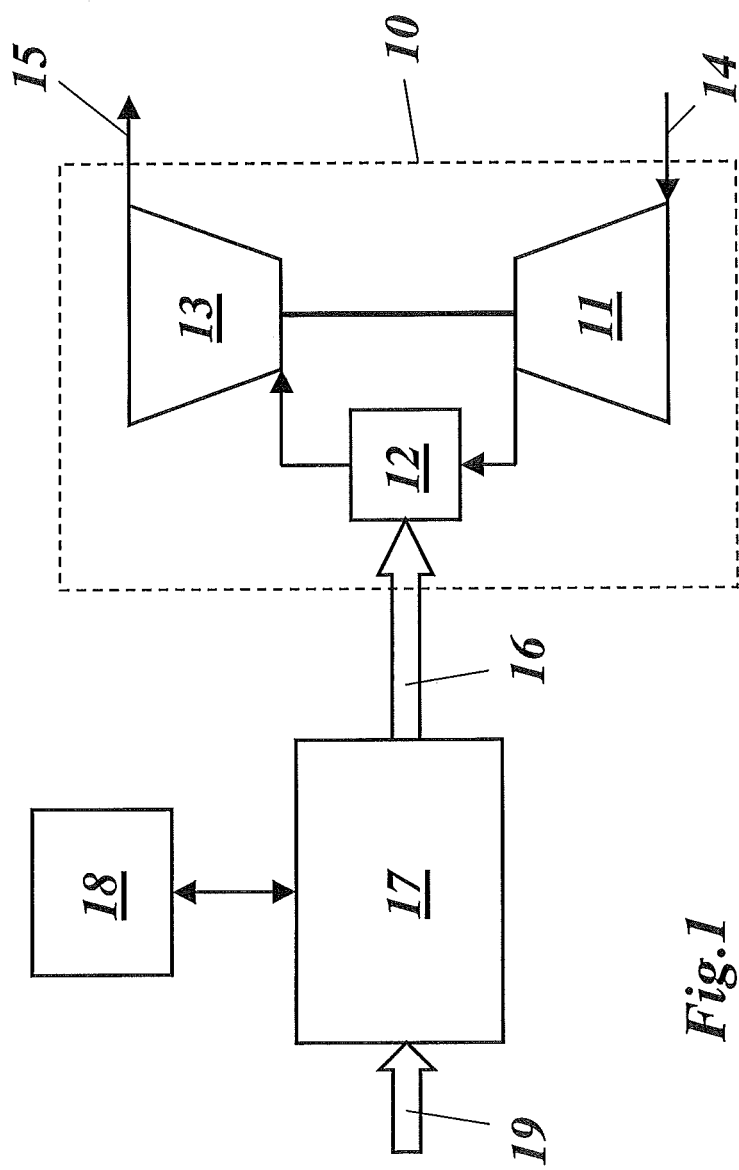
FIG. 1 shows a simplified schematic diagram of an exemplary gas turbine plant with compressor station for a gaseous fuel.

In FIG. 1, a simplified schematic diagram of a gas turbine plant with compressor station for a gaseous fuel is reproduced. The gas turbine plant 10 includes compressor 11 which via an air intake 14 draws in and compresses air and delivers the compressed air to a combustion chamber 12 where it is used for combusting a gaseous fuel or fuel gas which reaches the combustion chamber 12 via a fuel feed line 16. The resulting hot combustion gases can be expanded in a subsequent turbine 13, performing work, in order to drive, for example, a generator. The exhaust gases which are discharged via the exhaust gas outlet 15 can be discharged either directly to the environment or, by a heat recovery steam generator, can generate steam for the steam turbines of a combined-cycle process.

For the combustion process in the combustion chamber 12, a certain minimum pressure of the supplied fuel gas is desired (e.g., necessary), which, if the supply pressure is insufficient, has to be built up by an upstream compressor station 17 which compresses the fuel gas which is fed via the gas feed line 19. If the supply pressure fluctuates between values which are sufficient and insufficient for the combustion chamber 12, the compressor in the compressor station can be shut down in the former case and bypassed by a bypass system in order to at least temporarily save energy which is used by the compressor. A control unit 18, which according to the subsequently explained criteria, controls the operation of the compressor station 17, can be responsible for switching over between bypass operation and normal operation with compression.

Figure 2:
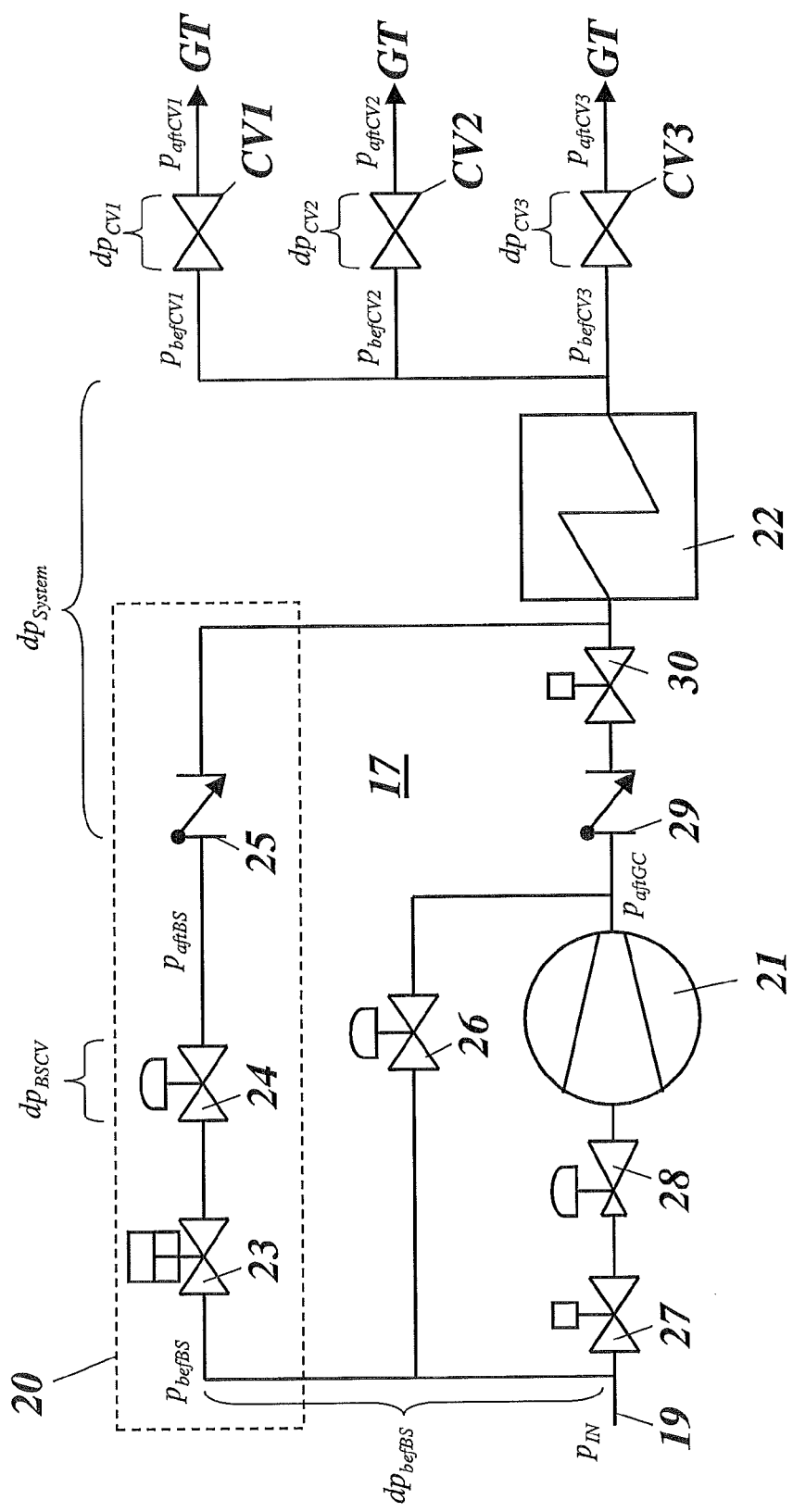
FIG. 2 shows a schematic diagram of an exemplary compressor station with bypass system.

FIG. 2 shows a simplified schematic diagram of the compressor station 17 which is equipped with a bypass system 20. Different pressures ($p_{Index}$) and pressure drops ($dp_{Index}$), which are provided with identifying indices and which play an important role for controlling the operation according to the disclosure, are inscribed in the schematic diagram. The fuel gas is fed via the gas feed line 19 to the compressor station 17 with a supply pressure $p_{IN}$. The supplied fuel gas can reach a heater 22 by two paths and from there, via a distribution system with corresponding control valves CV1, ..., CV3, can reach the gas turbine (GT) or its combustion chamber 12. The first path leads to the heater via a first shut-off valve 27, a pressure reducing valve 28, a compressor 21, a check valve 29 and a second shut-off valve 30. The pressure of the fuel gas at the outlet of the compressor 21 in this case has the value $p_{aftGC}$. Fuel gas from the outlet of the compressor 21 can be fed to the inlet of the compressor station 17 via an additional return valve 26.

The second path leads via the bypass system 20 which has an emergency shut-off valve 23, a control valve 24 and a second check valve 25. The bypass system 20 can be connected to the inlet (19) of the compressor station 17 via a piping system, which creates a pressure drop $dp_{befBS}$. The pressure $p_{befBS}$ prevails at the inlet of the bypass system 20 itself, and the pressure $p_{aftBS}$ prevails downstream of the valves 23 and 24. The pressure drop across the subsequent sub-system which extends as far as the control valves CV1, ..., CV3 is referred to as $dp_{System}$. The pressures of the fuel gas upstream and downstream of the control valves CV1, ..., CV3 are identified by $p_{befCV1, ..., 3}$ or $p_{aftCV1, ..., 3}$, and the pressure drop across the control valves CV1, ..., CV3 identified by $dp_{CV1, ..., 3}$.

The fuel gas can be fed to the gas turbine via the bypass system 20 as soon as the pressure $p_{aftBS}$ downstream of the control valve 24 of the bypass system is greater than the pressure $p_{aftGC}$ at the outlet of the compressor. Measuring points for the pressure are arranged on the gas feed line 19 ($p_{IN}$ is measured), at the outlet of the compressor 21 ($p_{aftGC}$ is measured), upstream of the emergency shut-off valve 23 of the bypass system 20 ($p_{befBS}$ is measured), downstream of the control valve 24 of the bypass system 20 ($p_{aftBS}$ is measured), upstream of the control valves CV1, ..., CV3 for the gas turbine ($p_{befCV1, ..., 3}$ is measured), and downstream of these control valves ($p_{aftCV1, ..., 3}$ is measured). In addition, the pressure drops $dp_{CV1, ..., 3}$ across these valves can also be determined.

The current value of the fuel gas pressure $p_{aftCV}$ downstream of a control valve CV (only the case of one control valve CV instead of the three control valves CV1, ..., CV3 is first of all taken into consideration) for the gas turbine reflects the gas pressure which is used by the gas turbine at the current output. The correspondingly desired (e.g., specified, or required) minimum pressure upstream of the control valve CV can be written as:

$$p_{befCV\_min} = p_{aftCV} + dp_{CV\_min} \quad (1)$$

wherein the minimum pressure drop across the control valve CV, which is desired (e.g., required) for a stable operation of the gas turbine, is identified by $dp_{CV\_min}$. The value $dp_{CV\_min}$ is specific for the respective plant and depends upon the stability reserve of the load control of the gas turbine. It changes with change of the fuel gas pressure $p_{befCV}$ upstream of the control valve CV but the ratio $dp_{CV\_min}/p_{befCV}$ can be assumed to be approximately constant:

$$dp_{CV\_min}/p_{befCV\_min} \alpha_{min} \approx \text{const.} \quad (2)$$

The equation (2) can be transformed as follows:

$$p_{befCV\_min} = \frac{1}{1 - \alpha_{min}} p_{aftCV} \quad (3)$$

The bypass operation can then correspondingly be commenced if the fuel gas pressure upstream of the control valve CV of the gas turbine across the bypass system 20 is higher than the minimum specified pressure:

$$p_{befBS} - dp_{BSCV} - dp_{System} \geq p_{befCV\_min} \quad (4)$$

wherein the pressures or pressure drops concerned have already been specified further up and also drawn in FIG. 2.

Only the case of a single control valve CV for the gas turbine GT was previously considered. If more than one control valve CV, for example, the three control valves CV1, CV2 and CV3 which are drawn in FIG. 2 are provided, and the fuel gas can be fed via a common compressor station 17 which is equipped with a bypass system, the maximum value of the minimum pressures which are required for each control valve according to equation (3) must be used as the criterion:

$$p_{befBS} - dp_{BSCV} - dp_{System} \geq \max\{p_{befCV1\_min}, p_{befCV2\_min}, \ldots\} \quad (5)$$

If the fuel gas pressure downstream of the control valve CV for the gas turbine cannot be measured, equation (3) can be transformed:

$$p_{befCV\_min} = \frac{1}{1 - \alpha_{min}} (p_{befCV} - dp_{CV}) \quad (6)$$

so that the switchover criterion can be adopted with other measured values. If pressure measurements of $p_{befBS}$ upstream of the emergency shut-off valve 23 of the bypass system 20 are not possible, the switchover criterion (4) can be rewritten as follows:

$$p_{IN} - dp_{befBS} - dp_{BSCV} - dp_{System} \geq p_{befCV\_min} \quad (7)$$

The pressure drop $p_{IN}$ between gas feed line 19 and inlet of the bypass system 20 in this case can be assumed to be constant or assumed to be a function of the supply pressure $p_{IN}$.

The different pressures and pressure differences which are inscribed in FIG. 2 and described above are measured during operation by suitable means, for example, by pressure transducers. The measured values are transmitted to the control unit 18. The control unit continuously evaluates the measured data and gives corresponding commands to the valves which are installed in the compressor station on the compressor section and in the bypass system in order to bring the fuel gas to the control valves CV upstream of the gas turbine either via the compressor section or via the bypass system.

Overall, the method according to the disclosure can be characterized by the following characteristics and features:

The current value of the fuel gas pressure downstream of the control valve CV for the gas turbine can be used for meeting the desired (e.g., necessary) gas pressure for the currently delivered output under currently prevailing ambient conditions.

The minimum ratio $\alpha_{min}$ of pressure drop across the control valve CV for the gas turbine to the pressure upstream of the control valve can be used to create the minimum necessary fuel gas pressure for a stable operation of the gas turbine regardless of the pressure upstream of the control valve.

The method can be extended to a plurality of control valves CV.

In the event of erroneous measurements, a switch can be made to other measured values.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List Of Designations

| | |
|---|---|
| 10 | Gas turbine plant |
| 11, 21 | Compressor |
| 12 | Combustion chamber |
| 13 | Turbine |
| 14 | Air inlet |
| 15 | Exhaust gas outlet |
| 16 | Fuel feed line |
| 17 | Compressor station |
| 18 | Control unit |
| 19 | Gas feed line |
| 20 | Bypass system |
| 22 | Heater |
| 23 | Emergency shut-off valve (bypass system) |
| 24 | Control valve (bypass system) |
| 25 | Check valve (bypass system) |
| 26 | Return valve |
| 27, 30 | Shut-off valve |
| 28 | Pressure reducing valve |
| 29 | Check valve |
| CV1, ..., CV3 | Control valve |
| $p_{IN}$ | Supply pressure |
| $p_{befBS}$ | Pressure (upstream of the emergency shut-off valve 23) |
| $p_{aftBS}$ | Pressure (downstream of the control valve 24) |
| $p_{aftGC}$ | Pressure (downstream of the compressor 21) |
| $p_{befCV1,\ldots,3}$ | Pressure (upstream of the control valve CV1, ..., CV3) |
| $p_{aftCV1,\ldots,3}$ | Pressure (downstream of the control valve CV1, ..., CV3) |
| $dp_{befBS}$ | Pressure drop (upstream of the bypass system) |
| $dp_{BSCV}$ | Pressure drop (at the control valve 24) |
| $dp_{System}$ | Pressure drop (in the system between control valve 24 and control valves CV1, ..., CV3) |
| $dp_{CV1,\ldots,3}$ | Pressure drop (at the control valve CV1, ..., CV3) |

What is claimed is:

1. A method for operating a gas turbine plant which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising:

measuring continuously the fuel gas pressure at an outlet of the at least one control valve;

determining for each valve a minimum fuel gas pressure, for operation of the gas turbine, at an inlet of the at least one control valve from the measured fuel gas pressure;

switching over the compressor station to a bypass operation if the fuel gas pressure which reaches the inlet of the at least one control valve via the bypass system is greater than or equal to the minimum fuel gas pressure;

wherein the minimum fuel gas pressure for operation of the gas turbine is determined in each case by multiplying the fuel gas pressure at the outlet of the at least one control valve by a factor $$\left( \frac{1}{1 - \alpha_{min}} \right),$$

wherein $\alpha_{min}$ is a number between 0 and 1; and wherein the factor is determined by means of the constant ratio of minimum pressure drop across the control valve to the fuel gas pressure at the inlet of the control valve.

2. A method for operating a gas turbine plant which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising:

measuring continuously a difference of the fuel gas pressure at an inlet of the control valve and of a pressure drop at the control valve;

determining for each valve a minimum fuel gas pressure for operation of the gas turbine, at the inlet of the at least one control valve from the measured difference; and switching over the compressor station to a bypass operation when the fuel gas pressure which reaches the inlet of the at least one control valve via the bypass system is greater than or equal to the minimum fuel gas pressure;

wherein the minimum fuel gas pressure for operation of the gas turbine is determined in each case by multiplying the fuel gas pressure ($P_{aftCV1}$, $P_{aftCV2}$, $P_{aftCV3}$) at the outlet of the at least one control valve by a factor $$\left(\frac{1}{1-\alpha_{min}}\right),$$

wherein $\alpha_{min}$ is a number between 0 and 1; and wherein the factor is determined by the constant ratio ($\alpha_{min}$) of minimum pressure drop across the control valve to the fuel gas pressure at the inlet of the control valve.

3. A method for operating a gas turbine plant which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising:

measuring continuously a difference of the fuel gas pressure at an inlet of the control valve and of a pressure drop at the control valve;

determining for each valve a minimum fuel gas pressure for operation of the gas turbine, at the inlet of the at least one control valve from the measured difference;

switching over the compressor station to a bypass operation when the fuel gas pressure which reaches the inlet of the at least one control valve via the bypass system is greater than or equal to the minimum fuel gas pressure, wherein the compressor directs the fuel gas to a plurality of control valves which are arranged in parallel, the method comprising:

continuously measuring the difference of the fuel gas pressure at the inlet of each of the control valves and of the pressure drop at each of the control valves;

determining from the measured pressure differences for each of the control valves a minimum fuel gas pressure, which is necessary for operation of the gas turbine, at the inlet of a corresponding control valve; and switching the compressor station over to the bypass operation when the fuel gas pressure which reaches the inlets of the control valves via the bypass system is greater than or equal to the maximum of the necessary minimum fuel gas pressures of all the control valves;

wherein the minimum fuel gas pressure which is necessary for operation of the gas turbine is determined in each case by multiplying the fuel gas pressure at the outlet of the at least one control valve by a factor $$\left(\frac{1}{1-\alpha_{min}}\right),$$

wherein $\alpha_{min}$ is a number between 0 and 1; and wherein the factor is determined by the constant ratio ($\alpha_{min}$) of minimum pressure drop across the control valve to the fuel gas at the inlet of the control valve.

4. A method for operating a gas turbine plant which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising:

a difference of the supply pressure at an inlet of the compressor station and of a pressure drop between the inlet of the compressor station and the bypass system;

determining for each valve a minimum fuel gas pressure, for operation of the gas turbine, at the inlet of the at least one control valve from the measured difference; and switching over the compressor station to a bypass operation when the fuel gas pressure which reaches the inlet of the at least one control valve via the bypass system is greater than or equal to the minimum fuel gas pressure;

wherein the minimum fuel gas pressure for operation of the gas turbine is determined in each case by multiplying the fuel gas pressure at the outlet of the at least one control valve by a factor $$\left(\frac{1}{1-\alpha_{min}}\right),$$

wherein $\alpha_{min}$ is a number between 0 and 1; and wherein the factor is determined by use of the constant ratio ($\alpha_{min}$) of minimum pressure drop across the control valve to the fuel gas pressure at the inlet of the control valve.

5. A method for operating a gas turbine plant which is supplied with a fuel gas via a compressor station, wherein the compressor station includes a compressor which compresses the fuel gas which is fed via a gas feed line and delivers it via at least one control valve to a combustion chamber of the gas turbine plant, and a bypass system is arranged in parallel to the compressor via which fuel gas can be directed in a switchable manner past the compressor to the at least one control valve, the method comprising:

measuring continuously a difference of the supply pressure at an inlet of the compressor station and of a pressure drop between the inlet of the compressor station and the bypass system;

determining for each valve a minimum fuel gas pressure, for operation of the gas turbine, at the inlet of the at least one control valve from the measured difference;

switching over the compressor station to a bypass operation when the fuel gas pressure which reaches the inlet of the at least one control valve via the bypass system is greater than or equal to the minimum fuel gas pressure, wherein the compressor directs the fuel gas to a plurality of control valves which are arranged in parallel, the method comprising:

continuously measuring the difference of the supply pressure at the inlet of the compressor station and of the pressure drop between the inlet of the compressor station and the bypass system;
determining from the measured pressure differences for each of the control valves a minimum fuel gas pressure, which is necessary for operation of the gas turbine, at the inlet of the corresponding control valve;
switching the compressor station over to the bypass operation when the fuel gas pressure which reaches the inlets of the control valves via the bypass system is greater than or equal to the maximum of the necessary minimum fuel gas pressures of all the control valves;
wherein the minimum fuel gas pressure which is necessary for operation of the gas turbine is determined in each case by multiplying the fuel gas pressure at the outlet of the at least one control valve by a factor $$\left(\frac{1}{1-\alpha_{min}}\right),$$

wherein $\alpha_{min}$ is a number between 0 and 1; and
wherein the factor is determined by use of the constant ratio ($\alpha_{min}$) of minimum pressure drop across the control valve to the fuel gas pressure at the inlet of the control valve.

* * * * *